Figure 1:
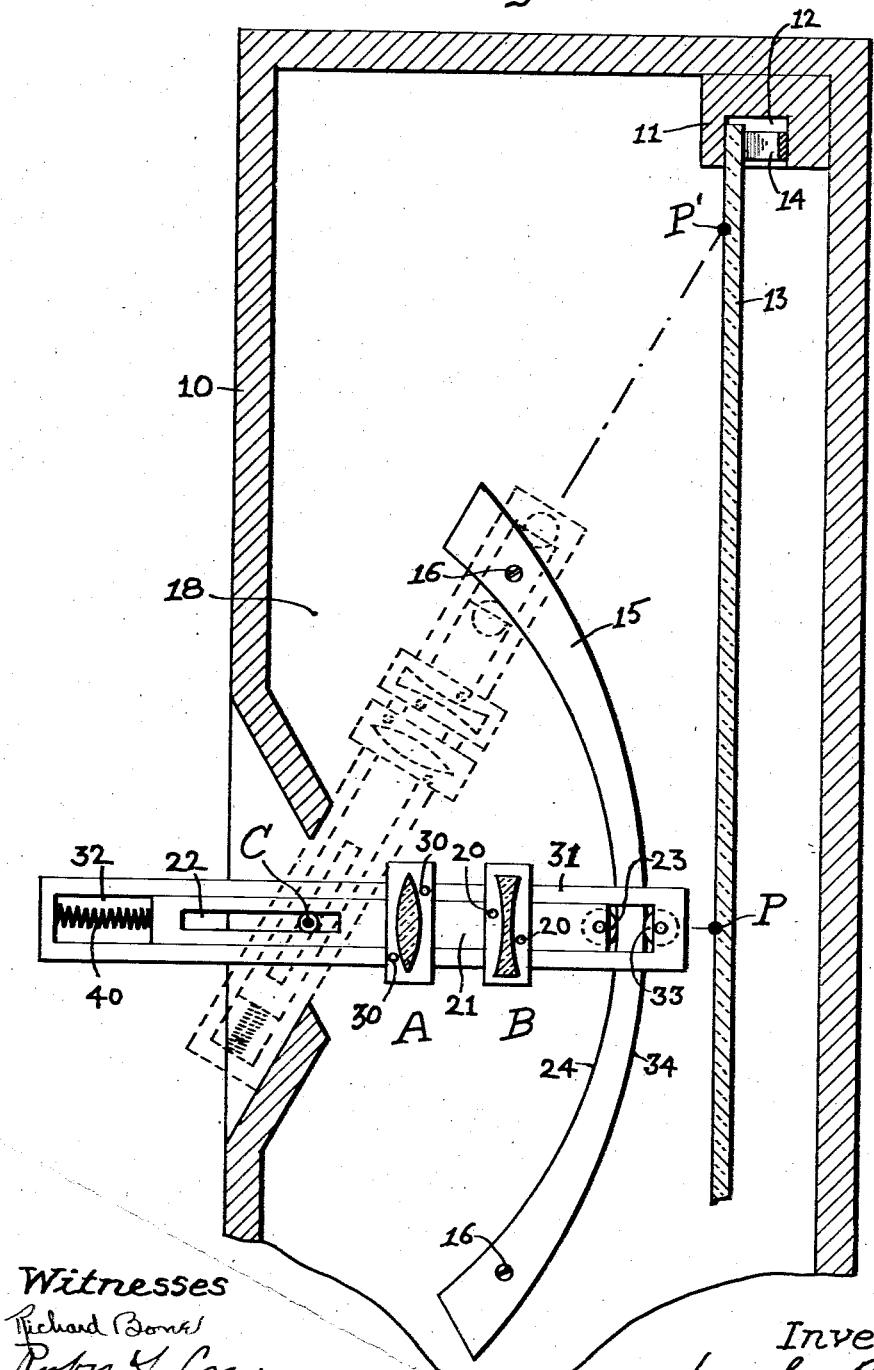

J. BECKER.
PANORAMIC PHOTOGRAPHIC CAMERA.
APPLICATION FILED JUNE 17, 1913.

1,136,761.

Patented Apr. 20, 1915.
6 SHEETS—SHEET 1.

Witnesses
Richard Bones
Ruby J. Cryer

Inventor
Joseph Becker

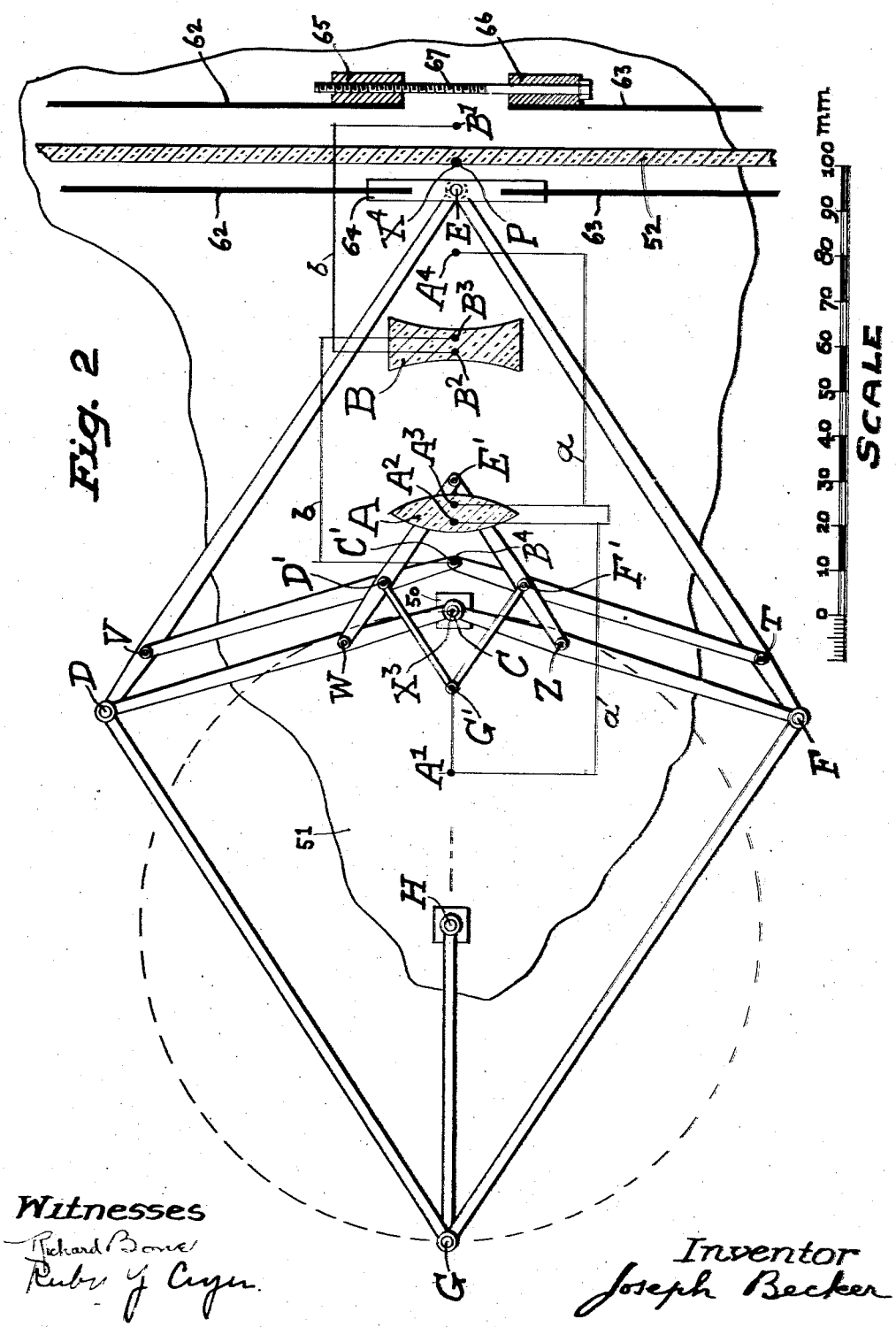

J. BECKER.
PANORAMIC PHOTOGRAPHIC CAMERA.
APPLICATION FILED JUNE 17, 1913.

1,136,761.

Patented Apr. 20, 1915.
5 SHEETS—SHEET 3.

Witnesses

Inventor
Joseph Becker

J. BECKER.
PANORAMIC PHOTOGRAPHIC CAMERA.
APPLICATION FILED JUNE 17, 1913.

1,136,761.

Patented Apr. 20, 1915.

Witnesses
Richard Bond
Ruby J. Cryn

Inventor
Joseph Becker

J. BECKER.
PANORAMIC PHOTOGRAPHIC CAMERA.
APPLICATION FILED JUNE 17, 1913.

1,136,761.

Patented Apr. 20, 1915.
5 SHEETS—SHEET 5.

Fig. 7

$X^3X^4 = x = 150 mm$ $A^3A^4 = a = +60 mm$ $B^3B^4 = b = -60 mm$ $a + b = 0\ mm$ $ab = -3600\ mm^2$ $X^3B^4 = CB^4 = CC' = \dfrac{a+b}{a} x = 0\ mm$ $B^4G' = C'G' = B^1A^4 = \dfrac{ab}{x} = -24\ mm$ $\dfrac{DE}{DC} = \dfrac{D'G'}{D'C'} = \dfrac{5}{3}$ $DE = 150\ mm$
$DC = 90\ mm$
$D'G' = 35\ mm$
$D'C' = 21\ mm$

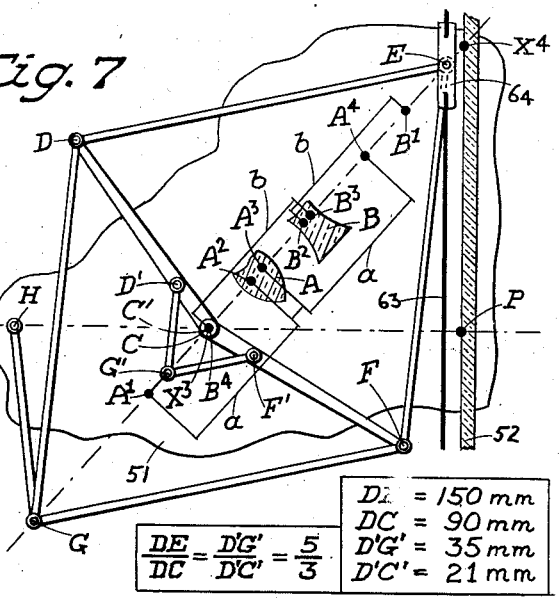

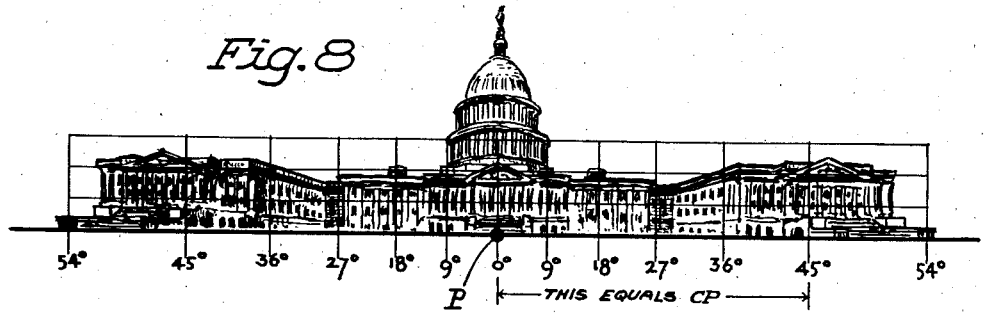

Fig. 8

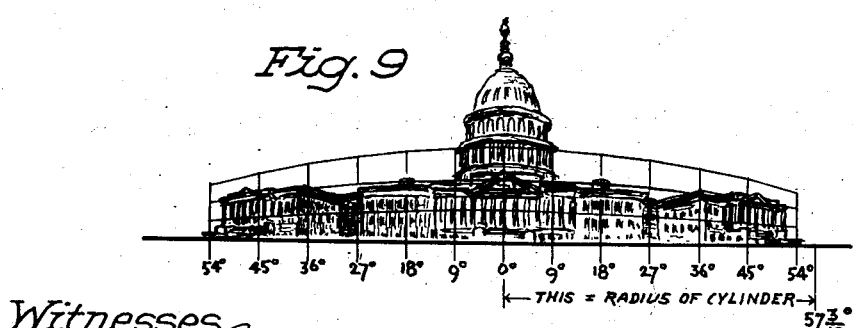

Fig. 9

THIS = RADIUS OF CYLINDER
$57\tfrac{3}{10}°$

Witnesses
Mary E. Smoot
Mary E. Cowell.

Inventor
Joseph Becker

UNITED STATES PATENT OFFICE.

JOSEPH BECKER, OF WASHINGTON, DISTRICT OF COLUMBIA.

PANORAMIC PHOTOGRAPHIC CAMERA.

1,136,761. Specification of Letters Patent. Patented Apr. 20, 1915.

Application filed June 17, 1913. Serial No. 774,220.

*To all whom it may concern:*

Be it known that I, JOSEPH BECKER, a citizen of the United States, residing at Washington, in the District of Columbia, have invented a new and useful Improvement in Panoramic Photographic Cameras, of which the following is a specification.

The present invention relates to panoramic cameras of the type in which the lens is made to rotate or revolve on a vertical axis, during exposure, in order to increase the horizontal angular extent of the view covered by the lens; and the object of the invention is to avoid the distorted perspective effects produced in prior cameras of such type. One of the earliest of these prior cameras is the rocking or rolling plate camera of Thomas Sutton, described in the article "Panoramic Camera" of Sutton's "*A Dictionary of Photography*," London, 1858, (copy at Patent Office Library); and one of the latest is the "Cylindrographe" of Moessard, described in "*La Nature*," Paris, July 18, 1885, pp. 103, 104; also in the "*Scientific American Supplement*," New York, September 19, 1885, pp. 8092, 8093. Whenever any one of such heretofore proposed rotating or revolving lens cameras is used to take a picture from a point close to and directly opposite the middle front of a long building, the main horizon line of the building will be reproduced as a straight line, but all higher and lower horizontal lines will be centrally bulged, producing an effect of barrel distortion. This distortion is as displeasing as it is untrue, and its equivalent is necessarily present in all pictures, however taken, although it is not as noticeable in landscapes as it is in architectural and street scenes.

The absolutely correct perspective is that which might be obtained with a common stationary flat plate pin hole camera; and my object is to secure this same correct perspective on a stationary flat plate with the aid of a rotating lens, so as to combine the wide angle and rectilinear properties of the pin hole with the sharpness and speed of a lens.

To this end the invention consists in causing the focal length of the lens to vary as the lens rotates in order that such focal length shall at every instant be equal to the distance that separates the vertical strip or image element being exposed from the axis of rotation of the lens and while doing this to radially displace the objective as may be necessary to keep the nodal point of emergence of the objective stationary in the axis of rotation.

The invention further consists in the means used for simultaneously producing these two effects automatically as the lens is rotated.

Incidentally, the invention permits of using a relatively narrow angle lens, such as telephoto-lens, for the same purposes as a wide angle lens.

Figure 4:
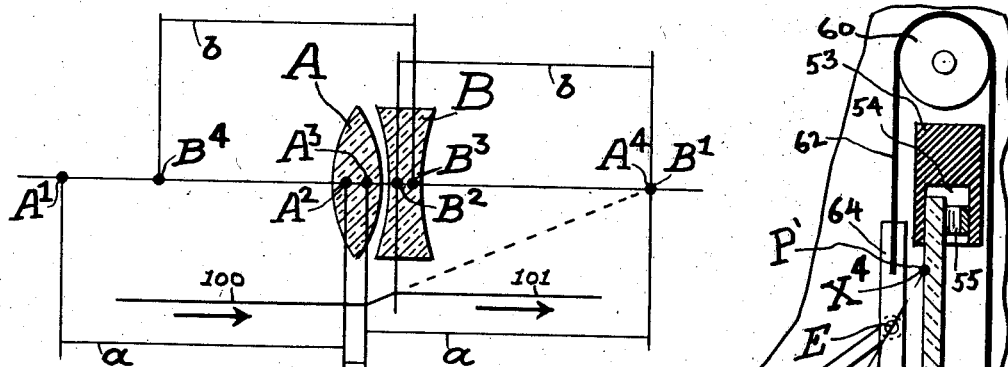
Figure 3:
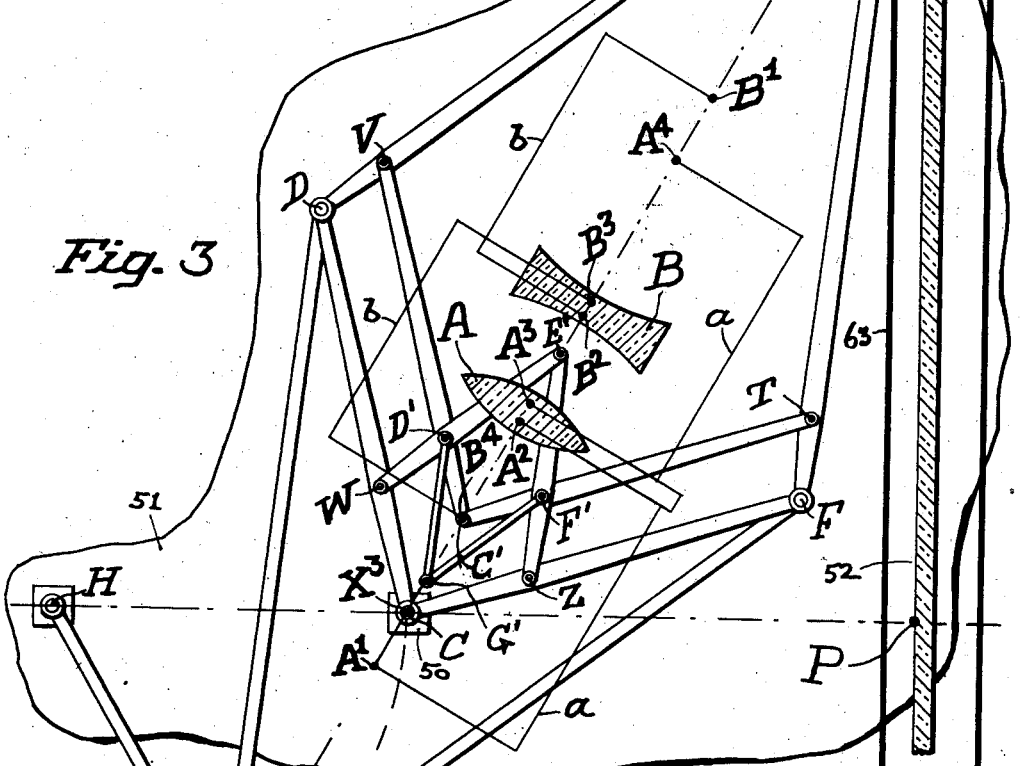
Figure 5:
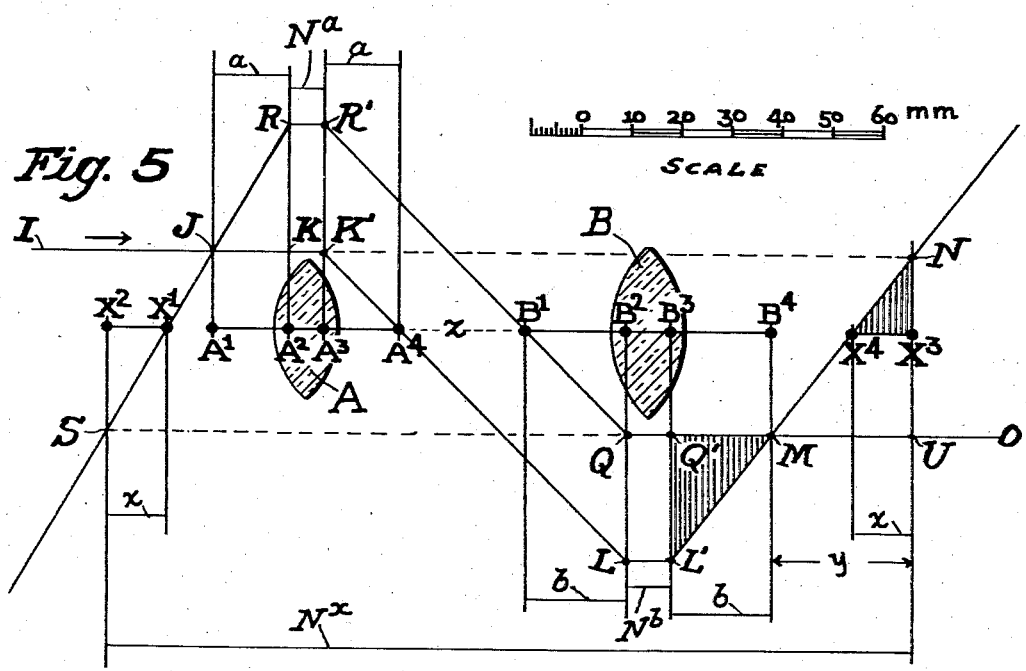
Figure 6:
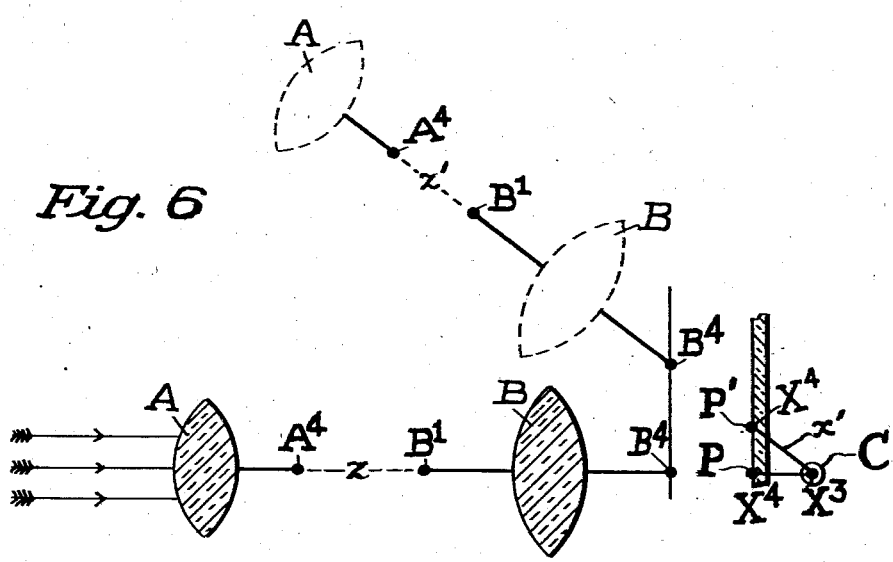

In the accompanying drawings: Figure 1 is a horizontal axial section of a very simple form of my invention in which the radial movements of the component lenses are controlled by cams. Fig. 2 is a similar view of another form in which the radial movements of the component lenses are controlled by a special form of linkage. Fig. 3 shows the parts of Fig. 2 slued around 60 degrees away from the middle position. Figs. 4, 5 and 6 are explanatory diagrams. Fig. 7 is a horizontal axial section showing the simplified form assumed by the linkage of Figs. 2 and 3 when the two lenses used have focal lengths that are numerically equal; the equations that apply being annexed to the figure as a part thereof. Fig. 8 is a pen sketch of the Capitol Building at Washington, D. C., as actually photographed with my stationary flat plate panoramic camera of the type having a rotary pinhole lens pivoted on its vertical diameter. Fig. 9 is a pen sketch of the same Capitol Building as it would have appeared if the camera used in making the picture of Fig. 8 had been replaced by an equal size panoramic camera of the common, or Moessard, type.

In Fig. 1 the camera consists of any suitable box 10 with corner posts, such as 11, grooved at 12 to receive the end of the plate (or plate and holder) 13 which is let in through a rectangular opening in the top wall of the box. Springs, such as 14, are provided for firmly holding the plate in its proper position.

The objective comprises at least two different lenses A and B, which move radially as they are slued around center pin C to make the exposure; and they are thus moved radially by a cam 15 which is fastened by screws 16 to the bottom bed plate 18 of the camera.

Fasteners 20 hold lens B in fixed relation to carriage 21, which is slotted at 22 to admit the center pin C; and fasteners 30 similarly hold lens A in fixed relation to carriage 31, which is slotted at 32 to admit and have longitudinal sliding engagement with the carriage 21.

A spring 40 acting radially between the two carriages 21, 31 keeps both carriages radially pressed against the cam plate 15; which virtually consists of two different cams, to wit, cam 24, to act on roller 23 of lens B and cam 34 to act on roller 33 of lens A.

The image produced by this camera is identical in outline with that produced by a pin hole situated at the center of the vertical axis through pin C. In the normal full line position, however, the focal length of the objective is CP and in the dotted position it is CP', or twice CP. The cam face 34 which controls lens A and the cam face 24 which controls lens B are plotted by considering that desirable variation in the focal length of the objective are produced by approaching or separating the lenses A and B as required and when the focal length for any given direction has thus been produced the objective as a whole must be moved radially on such direction to bring its focal point in coincidence with P or P' and its nodal point of emergence in coincidence with C.

In making the exposure the radial carriage 31 is slued around from its extreme dotted position Fig. 1, down through the full line position to the opposite extreme position, and during this motion the focal length of the resultant lens has first shortened from CP' to CP and again lengthened back to a length equal to CP'; meanwhile the nodal point of emergence of the resultant lens has remained absolutely stationary in the axis of rotation C. It is well understood in the art, since Moessard, that the axis of rotation of a panoramic rotating or revolving lens, must pass through the nodal point of emergence of such lens, in order that the image produced shall remain stationary on the plate or film while the lens is being rotated; and it is seen that my lens is designed to act in strict accordance with this Moessard principle.

*Simpler form.*—The construction is much simplified if the lenses A and B be carefully made of the same focal length, as by making lens A, for instance, with a focal length of plus 100 millimeters and lens B of a focal length of minus 100 millimeters. In such a combination I have discovered the remarkable fact that the two nodal points of the resultant lens for all relative positions of the component lenses A and B remain, respectively, coincident with principal foci of such components; and, as a consequence, the distance of the divergent lens B from the axis of pin C remains invariable and cam face 24 may be dispensed with by simply pivoting the carriage 21 of lens B on pin C. These conclusions may be verified in the following theory:

*Theory.*—The theory of the compound lens is not given with sufficient clearness for present purposes in any known treatise on optics, mainly because 3 full sets of 4 or 12 cardinal points in all have to be considered and distinguished. By using the principal foci as points of reference instead of the nodal points as usually done, I have succeeded in considerably simplifying not only the exposition of this complex subject, but the final formulae as well.

Any lense, whether simple or compound, is fully determined for all present purposes by plotting its 4 cardinal points, which are usually designated by F, N, N', F', where F, F' are the principal foci and N, N' are the nodal points. In the present specification these same four points are identified by indices 1, 2, 3 and 4 applied to the letter of the lens to which they belong.

It will further simplify matters to consider at first a combination such as that of Fig. 5 in which the component lenses A and B are both convergent and are sufficiently separated to prevent any overlapping of their lens elements. As will appear presently, the compound or resultant lens so produced will necessarily be a divergent lens, producing a real and erect image.

The left component lens A, which may itself be either simple or compound, has its own set of four cardinal points $A^1$, $A^2$, $A^3$, $A^4$, which are invariably located with relation to the lens and which determine an invariable focal length $A^1A^2$ equal $A^3A^4$, equal $a$ centimeters.

The right component lens B, which may also be either simple or compound, similarly has its own 4 invariably located cardinal points $B^1$, $B^2$, $B^3$, $B^4$ determining an invariable focal length $B^1B^2$, equal $B^3B^4$, equal $b$ centimeters.

The resultant lens designated by X has its four cardinal points $X^1$, $X^2$, $X^3$, $X^4$ relatively movable and determining a variable focal length $X^1X^2$ equal $X^3X^4$ equal $x$ centimeters. Thus in Fig. 5 we have $$A^1A^2 = A^3A^4 = a = +15 \text{ cm.}$$
$$B^1B^2 = B^3B^4 = b = +20 \text{ cm.}$$
$$X^1X^2 = X^3X^4 = x = -12 \text{ cm.}$$

The positive focal lengths are seen to run from left to right, with the light, whereas the negative focal lengths, such as $X^3 X^4$, run from right to left, or against the light. In each instance the index 1 refers to the object point or radiant point that produces parallel rays to the right; and the index 4 refers to the image point or focus produced by parallel rays from the left.

To make the illustration as clear as possible the cardinal planes of lens A are connected by focal bars $a$, $a$ and by the internodal bar $N^a$ and lense B has its cardinal planes similarly connected by focal bars $b$, $b$ and the internodal bar $N^b$. The four cardinal planes of the resultant lens X has similar focal bars $x$, $x$ and internodal bar $N^x$.

The light is assumed to proceed invariably from left to right so that the left hand principal focus $A^1$ of a simple convergent lens A is treated as an object point, as explained above; and the right hand principal focus $A^4$ of the same lens A is an image point. In a divergent lens such as the resultant lens X the left principal focus $X^4$ would be the image point and the right hand focus $X^1$ an object point. This rule insures that the focal length in the object space of any given lens and the numerically equal focal length in the image space of the same lens shall both and under all circumstances have the same algabraic sign as in optometry, where the power of a lens expressed in dioptries is invariably plus for a convergent lens and invariably minus for a divergent lens.

$A^4$ being the principal focus of lens A for parallel rays, such as IK, from the left; and $B^1$ the principal focus of lens B for parallel rays such as RS coming from the right, let the distance $z$ equal $B^1A^4$ be used to define the relative position of the two lenses.

Rays used in lens graphics may be considered as laterally magnified representations of real rays proceeding close along the lens axis, and no change is produced in the location of images by any desired degree of lateral magnification. I have accordingly greatly simplified all calculations by purposely making the lateral magnification such as to produce interlenticular rays TS and KL that are inclined at 45 degrees. As a result, RK equal R'K' equal QL equal Q'L' are all equal to $z$; moreover, all points on the straight line IN are at a distance $A^3K'$ equal $a$ above the principal axis $X^2X^3$ of the objective; and all points on the straight line SO are at a distance $B^2Q$ equal $b$ below such same principal axis.

Point $X^3$ corresponds to the pin hole or fixed axis of rotation C and this point, therefore, is the most convenient point of reference to start from. In lens B the most convenient points of reference are $B^4$, the principal focus for parallel rays from the left, and $B^1$, the principal focus for parallel rays from the right. In lens A the most convenient and only point of reference to be considered is $A^4$, the principal focus for parallel rays from the left.

For any given angular position P'CP of the objective three different variables are to be considered, namely, $x$, $y$ and $z$. Variable $x$ is the desired focal length $X^3X^4$ of the objective or resultant lens; variable $y$ is the distance $X^3B^4$ of lens B as measured from $X^3$ or C to the principal focus $B^4$ of B for parallel rays from the right; variable $z$ is the distance $B^1A^4$ of the first lens A from the second B as measured from B's principal focus $B^1$ for parallel rays from the right to A's principal focus $A^4$ for parallel rays from the left.

*Calculation of $X^3X^4$ or $x$.*—This is the focal length of the resultant lens. Referring to Fig. 1, it is seen that the minimum value of $x$ is CP, P being the center of the sensitized plate or film. If CP' generally represents any angular position of the objective, than angle PCP' will serve to define such position, and CP' will be its corresponding focal length. We, therefore, have $$x = CP' = CP/\cos. PCP' \quad (1)$$

This focal length $x$ may be either positive or negative. In Figs. 1, 2 and 3 it is positive, in Figs. 5 and 6 it is negative.

*Calculation of $X^3B^4$ or $y$.*—This defines the position of the second lens. Referring to Fig. 5, the triangle $X^3X^4N$ in which $X^3X^4$ equals $x$ and $X^3N$ equals $a$ is similar to the triangle MUN in which MU equals $y$ and UN equals $(a+b)$. We, therefore, have $$\frac{y}{x} = \frac{a+b}{a}$$

whence $$X^3B^4 = y = x\frac{(a+b)}{a} \quad (2)$$

where the fraction $(a+b) : a$ is a constant, so that $y$ is directly proportional to $x$. The full meaning of this important result is illustrated in Fig. 6, where the lenses A and B in the full line position are placed exactly as in Fig. 5, so that they would have to be pivoted at $X^3$ as indicated by the addition of pin C, with the camera plate at $X^4X^4$. If now the objective be turned to point as in the dotted position the focal length $x$ is increased in the proportion of CP' to CP or as 5 to 4, and the distance $X^3B^4$ or $y$ is increased in the same proportion. As the objective is slued around C the principal focus $B^4$ of lens B for parallel rays from the left must, therefore, describe a line $B^4B^4$ that is exactly parallel to the camera plate. Variable $y$ may, therefore, be derived mechanically from variable $x$ by means of pantographic linkage.

*Calculation of $B^1A^4$ or $z$.*—This is the distance of lens A from lens B as measured from B's focus $B^1$ of parallel rays from the right to A's focus of parallel rays from the left. The shaded triangle $X^4X^3N$, in which $X^3X^4$ equals $x$ and $X^3N$ equals $a$, and the shaded triangle MQ'L' in which Q'M equals $b$ and Q'L' equals $z$ yield directly $$\frac{z}{b} = \frac{a}{x}$$

whence $$xz = ab \quad (3)$$

which yields $$x = \frac{ab}{z} \quad (4)$$

and $$B^1A^4 = z = \frac{ab}{x} \quad (5)$$

By formula 3 we see that the product $xz$ is a constant so that constant product mechanism may be used to derive $z$ from $x$.

*Numerical verification.*—The scale seen over Fig. 5 will permit of verifying the above formulæ. In Fig. 5 the dimensions are $$A^3A^4 = a = +15 \text{ mm.}$$
$$B^3B^4 = b = +20 \text{ mm.}$$
$$X^3X^4 = x = -12 \text{ mm.}$$
$$X^3B^4 = y = -28 \text{ mm.}$$
$$B^1A^4 = z = -25 \text{ mm.}$$

In Fig. 6 for the full line position of A and B the dimensions are the same as in Fig. 5, but in the inclined position the variables are $$x' = -15 \text{ mm.}$$
$$y' = -35 \text{ mm.}$$
$$z' = -20 \text{ mm.}$$

*Linkage form* (Figs. 2 and 3).—The cam form, Fig. 1, is very simple and will work very smoothly, especially if the cam be plotted at as great a distance as convenient from the axis of rotation C to flatten and smooth the cam curves as much as possible. In view of the results secured by the above theoretical discussion, however all desired motions may also be produced by definite kinematic combinations or a linkage. In Figs. 2 to 4 I show such linkage as applied to a camera comprising a plus lens and a minus lens substantially as in Fig. 1. The pin hole $X^3$ of the combination is located in the axis of pivot C mounted on a stand 50 fastened to the camera bed 51. The plate 52 is held substantially as in Fig. 1 by end posts, such as end post 53, with recess 54 extending up to the top wall of the camera which is slotted to permit of inserting the plate or its plate holder from above. Springs, such as 55, serve to hold the plate in proper focal position. Externally of the two posts 53 are mounted rollers 60, only one of which appears in Fig. 3. Surrounding the plate 52, post 53 and rollers 60 is a flexible light-proof band comprising 2 equal halves 62, 63. These halves are connected in front of the plate at the bottom by a metallic bar 64. This bar 64 and a similar bar at the top determine the exposing slit of the focal plane shutter 62, 63. At the rear a suitable belt tightener 65, 66, 67 is provided.

The central point E of the exposing slit is constrained to move exactly parallel with the camera plate by means of a Peaucellier linkage CDEFGH which need not be further described, except to note that point G follows a circle passing through C. A smaller linkage C'D'E'F'G' having all its rods proportional to the similarly lettered rods of the large linkage is mounted by means of extensions of its own rods on the large linkage, at points V, W, T and Z. The figures DVD'W and FTF'Z are parallelograms so as to establish a pantographic connection between the large linkage and the smaller and keep the two exactly similar throughout all deformations. Point C' is thus controlled to move parallel to the camera plate so that the distance CC' is and remains a constant fractional part of the distance CP' or $x$ the desired variable focal length. The variable distance G'C' in the smaller linkage also bears a constant relation to the distance GC in the larger, and as GC is inversely proportional to CE and to $x$, G'C' will always be inversely proportional to $x$.

Lens B is connected to point C' of the smaller linkage so that its principal focus $B^4$ for parallel rays from the left shall coincide with a point of the vertical axis C'. The connections are diagrammatically indicated by lines $b$, $b$ and the cardinal planes of the lens.

Lens A is connected to point G' of the smaller linkage so that the distance C'G' in such linkage shall always equal the distance $B^1A^4$. This connection is similarly indicated by lines $a$, $a$, the focal planes, and an additional constant line A'G', the exact length of which will be determined by the condition just given.

The connections are such that if C'G' could be reduced to zero value $B^1A^4$ would also become nil, as indicated in Fig. 4, and the focal length of the combination would be infinite. That is to say, a ray of light 100 would pass through as a ray 101, Fig. 4, without deviation though offset toward the lens axis.

Fig. 2 is drawn to the scale shown so that all conditions given in the "theory" may easily be verified.

$$A^3A^4 = a = +56 \text{ mm.}$$
$$B^3B^4 = b = -50 \text{ mm.}$$
$$X^3X^4 = x = +100 \text{ mm.}$$
$$a + b = +6$$
$$ab = -2800$$

By equation 2 of the theory $$X^3B^4 = y = \frac{100 \times 6}{56} = +10.7 \text{ mm.}$$

By equation 5

$$B^1A^4 = z = \frac{-2800}{100} = -28 \text{ mm.}$$

In Fig. 3 the proportions are the same except as to the three variables $x$, $y$, $z$, which have new values:

$$CP' = x' = +200.0 \text{ mm.}$$
$$X^3B^4 = y' = +21.4 \text{ mm.}$$
$$B^1A^4 = z' = -14.0 \text{ mm.}$$

*Simpler linkage form*, (Fig. 7.)—If the lenses A and B used in the camera of Fig. 2 have focal lengths $a$ and $b$ that are numerically equal, then the sum $(a+b)$ in equation 2 becomes *nil*, making $X^3B^4$ equal zero and causing point C' to fall in with the stationary axis C. The four equal distances DV, WD', FT, ZF' being proportional to CC' also vanish and the linkage assumes the simpler form of Fig. 7, which is drawn to the scale shown and in accordance with the values given in the twelve equations annexed to the figure, such values being selected to be whole numbers.

As in Fig. 2 the minimum focal length CP equals 100 mm., and the maximum focal length is supposed to be 200 mm. The parts are shown set for an intermediate focal length $X^3X^4$ equal 150 mm. and the corresponding variable Peaucellier space CE is 140 mm. The links DE and DC which determine the large Peaucellier cell may in accordance with Peaucellier practice have any arbitrarily desired values that do not make the angle CDE either too small when E is on the principal axis CP or too large when E is in one of the extreme positions. To facilitate numerical verification the dimensions selected for the large Peaucellier cell are DE equal to 150 mm. and DC equal 90 mm.; and the corresponding proportional dimensions of the smaller Peaucellier cell are D'G' equal 35 mm. and D'C' equal 21 mm.

The calculated value of link HG and its equal HC is $77\frac{1}{7}$ mm. exactly, but no attempt has been made to give this link a whole number value, because if point E be guided in a slot the three links of the large linkage connected at G may be suppressed and the device will operate as before. With other guides to keep G', C and E alined the six links could be reduced to three, to wit: ED, CD, G'D'; but this further simplification is not desirable because it introduces side pressures that tend to produce binding.

Fig. 8 shows, sketched to the scale of Fig. 7, a picture of the U. S. Capitol at Washington as it might be taken with any one of my stationary flat plate panoramic cameras having a depth CP equal to 124 millimeters; and Fig. 9 shows, drawn to the same scale, the same view as it would be taken from the same point of view, with a 124 millimeter radius panoramic camera of the common or Moessard type.

The central parts of the two pictures are of the same size and are substantially similar, but the ends differ considerably. Fig. 8 shows the broad architectural features of the Capitol in their familiar and imposing grandeur, while Fig. 9 is shockingly distorted. The exact nature of this distortion is illustrated with the aid of thirteen equally long plumb lines marked 0°, 9°, 18°, 27°, 36°, 45°, and 54°, hanging nine degrees apart, at the same level and in the same vertical plane parallel to the front of the Capitol. In Fig. 8 these plumb lines are correctly reproduced as being of the same length and as being unequally spaced. In Fig. 9 these same plumb lines are incorrectly reproduced of different lengths and equally spaced.

As the linkage herein disclosed is capable of use, at least in its simpler forms, wherever a constant product mechanism is required, it has been made the subject-matter of a separate application for patent, Serial No. 14,178, which was filed March 13, 1915, as a division of the present application.

I claim:

1. A photographic camera having a compound objective mounted to rotate or revolve about a vertical axis and provided with means for changing the radial distances of one or more of its component lenses from the axis of rotation during the rotation.

2. A photographic camera having a compound objective mounted to rotate or revolve about a vertical axis and provided with mechanism for changing the radial distances of one or more of its component lenses from the axis of rotation during the rotation, such means comprising an asemblage of pivoted rods.

3. A photographic camera having a compound objective mounted to rotate or revolve about a vertical axis and provided with mechanism for changing the radial distances of one or more of its component lenses from the axis of rotation during the rotation, such means comprising a large Peaucellier linkage carrying a smaller and similar linkage.

4. A panoramic camera having its plate both flat and stationary, and having its objective mounted to rotate or revolve about a vertical axis, such objective being composed of a plus lens and minus lens whose focal lengths are numerically equal.

5. A panoramic camera having its plate or film both flat and stationary, and having its objective mounted to rotate about a vertical axis, passing through the nodal point of emergence of such objective.

In testimony whereof, I have signed my name to this specification in the presence of two subscribing witnesses.

JOSEPH BECKER.

Witnesses:
 SAM W. COCKRELL,
 C. E. FETZER.

It is hereby certified that in Letters Patent No. 1,136,761, granted April 20, 1915, upon the application of Joseph Becker, of Washington, District of Columbia, for an improvement in "Panoramic Photographic Cameras," errors appear in the printed specification requiring correction as follows: Page 2, line 18, for the word "variation" read *variations;* same page, lines 77 and 129, for the word "lense" read *lens;* page 3, line 4, for "$N^x$" read $N^x;$ same page, line 76, for the word "than" read *then;* same page, line 79, for the abbreviation "cos." read *cos;* page 5, line 95, for the word "asemblage" read *assemblage;* and that the said Letters Patent should be read with these corrections therein that the same may conform to the record of the case in the Patent Office.

Signed and sealed this 25th day of May, A. D., 1915.

[SEAL.]
R. F. WHITEHEAD,
*Acting Commissioner of Patents.*